United States Patent
Yu (10) Patent No.: US 8,516,028 B2
(45) Date of Patent: Aug. 20, 2013

(54) SYSTEM AND METHOD FOR PROVIDING MEMORY BANDWIDTH EFFICIENT CORRELATION ACCELERATION

(75) Inventor: Meng-Lin Yu, Morganville, NJ (US)

(73) Assignee: LSI Corporation, San Jose, CA (US)

( * ) Notice: Subject to any disclaimer, the term of this patent is extended or adjusted under 35 U.S.C. 154(b) by 476 days.

(21) Appl. No.: 12/849,142

(22) Filed: Aug. 3, 2010

(65) Prior Publication Data

US 2012/0036174 A1    Feb. 9, 2012

(51) Int. Cl.
*G06F 17/15* (2006.01)

(52) U.S. Cl.
USPC .......................................... 708/422

(58) Field of Classification Search
None
See application file for complete search history.

(56) References Cited

U.S. PATENT DOCUMENTS

| | | | | |
|---|---|---|---|---|
| 5,896,304 A | * | 4/1999 | Tiemann et al. .................. | 708/5 |
| 6,574,649 B2 | * | 6/2003 | McGrath ........................ | 708/420 |
| 7,039,091 B1 | * | 5/2006 | Mauer ............................ | 375/140 |
| 7,606,292 B1 | * | 10/2009 | Harris et al. ................... | 375/142 |
| 2008/0267261 A1 | | 10/2008 | Wang et al. | |

* cited by examiner

*Primary Examiner* — David H Malzahn
(74) *Attorney, Agent, or Firm* — Kermit D. Lopez; Luis M. Ortiz; Ortiz & Lopez, PLLC (57) ABSTRACT

A system and method for providing memory bandwidth efficient correlation acceleration. A correlation accelerator or correlator (e.g., an X*Y correlator) can be configured in association with a processor of a wireless communication system for correlating an input signal data sequence (X) and its shifted versions with a reference data sequence. Shifted versions (including the 0-shifted or the original) with respect to the input signal data sequence can be generated for each column (Y columns) of a sliding window in the correlator in order to reduce an input bandwidth requirement. Each input signal data and the shifted versions can be concurrently multiplied with the reference signal data and the results can be summed together in order to generate an output signal data profile. The output signal data profile can be stored into an accumulator register in order to reduce an output bandwidth requirement.

20 Claims, 8 Drawing Sheets

| | | J=0 | J=1 | J=2 | J=3 | J=4 | J=5 | J=6 | J=7 |
|---|---|---|---|---|---|---|---|---|---|
| r11 | * | d11 | d12 | d13 | d14 | d15 | d16 | d17 | d18 |
| r10 | * | d10 | d11 | d12 | d13 | d14 | d15 | d16 | d17 |
| r9 | * | d9 | d10 | d11 | d12 | d13 | d14 | d15 | d16 |
| r8 | * | d8 | d9 | d10 | d11 | d12 | d13 | d14 | d15 |
| r7 | * | d7 | d8 | d9 | d10 | d11 | d12 | d13 | d14 |
| r6 | * | d6 | d7 | d81 | d9 | d10 | d11 | d12 | d13 |
| r5 | * | d5 | d6 | d7 | d8 | d9 | d10 | d11 | d12 |
| r4 | * | d4 | d5 | d6 | d7 | d8 | d9 | d10 | d11 |
| r3 | * | d3 | d4 | d5 | d6 | d7 | d8 | d9 | d10 |
| r2 | * | d2 | d3 | d4 | d5 | d6 | d7 | d8 | d9 |
| r1 | * | d1 | d2 | d3 | d4 | d5 | d6 | d7 | c8 |
| r0 | * | d0 | d1 | d2 | d3 | d4 | d5 | d6 | d7 |
| | | Σ | Σ | Σ | Σ | Σ | Σ | Σ | Σ |
| | | acc0 | acc1 | acc2 | acc3 | acc4 | acc5 | acc6 | acc7 |

SYSTEM AND METHOD FOR PROVIDING MEMORY BANDWIDTH EFFICIENT CORRELATION ACCELERATION

TECHNICAL FIELD

Embodiments are generally related to wireless communication systems and methods. Embodiments are also related to digital signal processors and/or co-processors. Embodiments are additionally related to correlation computing techniques. Embodiments are further related to methods and systems for providing memory bandwidth efficient correlation acceleration.

BACKGROUND OF THE INVENTION

Digital signal processors and/or co-processors are typically utilized to perform computationally intensive data processing in a wide variety of wireless communication systems. In digital signal processing, correlation (also known as cross-correlation, sliding dot product or inner-product) is a measure of similarity between an input waveform signal and a reference waveform signal as a function of an applied time lag.

A correlator typically receives and compares a sequence of input signals along with its one or more shifted versions with a sequence of reference signal and produces a profile, one value for each original and shifted version (each time lag), in order to determine one or more appropriate shifted versions most resembling the reference sequence. Such correlation computation can be extensively utilized in the communication systems to determine the timing of a pre-determined 'pilot' signal as well as in applications such as pattern recognition, single particle analysis, electron tomographic averaging, and cryptanalysis. For an input sequence length of L and a number of time lags W, the required computation complexity is $O(L*W)$. Because of the large number of calculations required, it is therefore highly desirable to accelerate correlation computation in such wireless communication applications.

However, adding an instruction (intrinsic) to accelerate the correlation in traditional digital signal processors, which have very limited number of operands and memory accesses per instruction, is difficult because of the large number of input data required in the correlation for high speedup. The large number of input data translates to memory width increase and therefore memory bandwidth increase in a traditional digital signal processor. More recent digital vector processors/co-processors offers a wider data path and can have more operands than traditional digital signal processors. The number of input data required, however, is still too large for very fast applications.

Most prior art approaches for accelerating correlation computation include a software application that is implemented in association with the digital signal processor and/or co-processor of the wireless communication system. Furthermore, a hard-wired accelerator can be configured in association with the digital signal processor in order to handle correlation computation in receiver functions such as a path searcher in a wideband code division multiple access (WCDMA) RAKE receiver. The operations of the accelerator typically include setting up parameters, shipping the data out of processor to the accelerator, and reading the result from the processor. Such prior art approaches, however, incur long latency and lack flexibility, thus hindering the ability of digital signal processors to support the evolving wireless communication standards.

Based on the foregoing, it is believed that a need exists for an improved method and system for providing an easily programmable, flexible and memory bandwidth efficient correlation accelerated instruction in the context of digital signal processors and/or coprocessors, as described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved wireless communication system.

It is another aspect of the disclosed embodiments to provide for an improved correlation computation technique.

It is a further aspect of the disclosed embodiments to provide for an improved method for providing memory bandwidth efficient correlation acceleration.

The aforementioned aspects and other objectives and advantages can now be achieved as described herein. A system and method for providing memory bandwidth efficient correlation acceleration is disclosed herein. A correlation accelerator or correlator (e.g., an X*Y correlator) can be configured in association with a processor (e.g., a digital signal processor or a co-processor) of a wireless communication system for correlating an input signal data sequence (X) and its shifted versions with a reference signal data sequence. Shifted versions (including the 0-shifted or the original) with respect to the input signal data sequence can be generated for each column (Y columns) of a sliding window in the correlator in order to reduce an input bandwidth requirement. Each input signal data and the shifted versions can be concurrently multiplied with the reference signal data and the results can be summed together in order to generate an output signal data profile. The output signal data profile can be stored into an accumulator register in order to reduce an output bandwidth requirement. Such an approach can be effectively utilized for accelerating correlation computation in a wide range of wireless communication systems.

The shifted versions can also be generated with respect to the reference signal data sequence and multiplied with the input signal data sequence in order to generate the output signal data profile, one value for each original and shifted version (each time lag) in the processor. Since each input data value can be employed in one or more shifted versions/columns, the input reuse can be exploited in order to achieve the input bandwidth reduction. The correlator can be typically configured to include a plurality of adders, an array of multiplexers, an array of complex carry save adders, and an array of accumulators. The output signal data profile at each column of the sliding window can be summed via an adder (e.g., an accumulator).

The correlator can be tightly integrated into a data path of the processor in order to provide an intrinsic operation (e.g., a processor instruction) in the wireless communication system. A correlation computation array associated with the sliding window can be divided into one or more blocks (X*Y size blocks) in order to compute a partial correlation with respect to each block in the sliding window. The output signal data profile from each column in the sliding window can be iteratively summed to a previous partial computation result utilizing an adder in order to accelerate the correlation computation in the processor. Such an approach can be utilized in a wide variety of computation techniques that satisfies the input reuse and output reduction properties.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
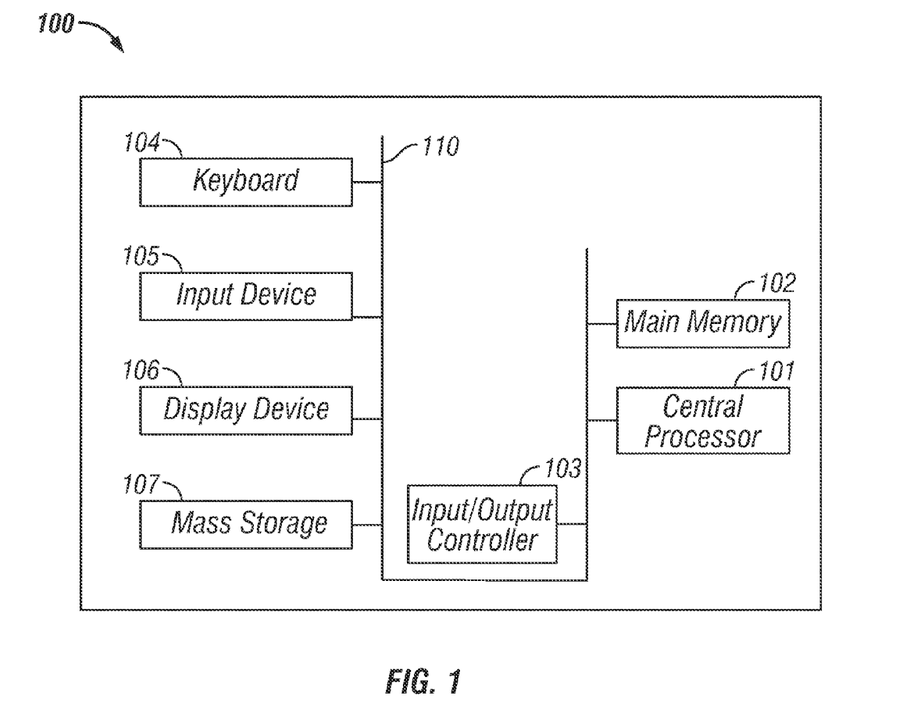
FIG. 1 illustrates a schematic view of a computer system, in accordance with the disclosed embodiments.
Figure 2:
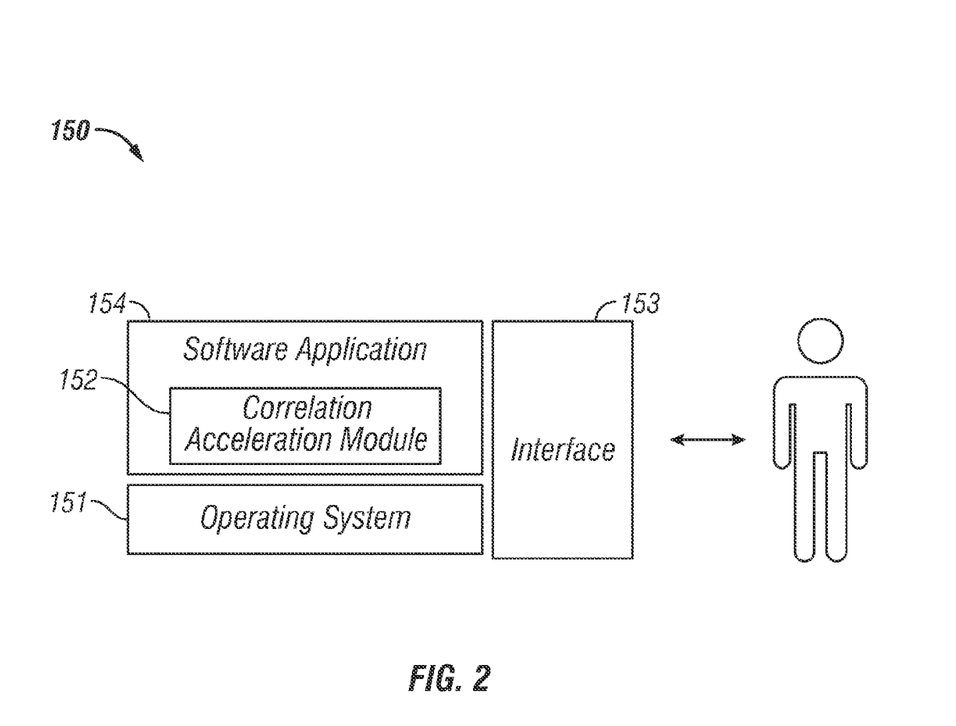
FIG. 2 illustrates a schematic view of a software system including a correlation acceleration module, an operating system, and a user interface, in accordance with the disclosed embodiments.

FIGS. 1-2 are provided as exemplary diagrams of data-processing environments in which embodiments of the present invention may be implemented. It should be appreciated that FIGS. 1-2 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 1, the disclosed embodiments may be implemented in the context of a data-processing system 100 that includes, for example, a central processor 101, a main memory 102, an input/output controller 103, and a mass storage 107 (e.g., a hard disk). Additional input/output devices such as a keyboard 104, an input device 105 (e.g., a pointing device, such as a mouse, track ball, pen device, etc), and a display device 106 may be associated with the data-processing system 100 as desired. As illustrated, the various components of data-processing system 100 can communicate electronically through a system bus 110 or similar architecture. The system bus 110 may be, for example, a subsystem that transfers data between, for example, computer components within data-processing system 100 or to and from other data-processing devices, components, computers, etc.

FIG. 2 illustrates a computer software system 150 for directing the operation of the data-processing system 100 depicted in FIG. 1. Software application 154, stored in main memory 102 and on mass storage 107, generally includes a kernel or operating system 151 and a shell or interface 153. One or more application programs, such as software application 154, may be "loaded" (i.e., transferred from mass storage 107 into the main memory 102) for execution by the data-processing system 100. The data-processing system 100 receives user commands and data through a medium (e.g., an antenna); these inputs may then be acted upon by the data-processing system 100 in accordance with instructions from operating system module 151 and/or software application 154.

The following discussion is intended to provide a brief, general description of suitable computing environments in which the system and method may be implemented. Although not required, the disclosed embodiments are herein described in the general context of computer-executable instructions, such as software program or software modules, which can be executed by a single computer or, for example, a group of computers and/or processors working together to execute such instructions. In most instances, a "module" constitutes a software application.

Generally, program modules include, but are not limited to routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 153, which is preferably a graphical user interface (GUI), can serve to display results, whereupon a user may supply additional inputs or terminate a particular session. In some embodiments, operating system 151 and interface 153 can be implemented in the context of a "Windows" system. It can be appreciated, of course, that other types of operating systems and interfaces may be alternatively utilized. For example, rather than a traditional "Windows" system, other operation systems such as, for example, a Real Time Operating System (RTOS) more commonly employed in wireless systems may also be employed with respect to operating system 151 and interface 153. The software application 154 can include, for example, a correlation acceleration module 152 for providing memory bandwidth efficient correlation acceleration in a wireless communication system. The correlation acceleration module 152 can include instructions such as those of method 500 and 600 discussed herein with respect to FIGS. 7-8.

FIGS. 1-2 are thus intended as an example and not as an architectural limitation with respect to particular embodiments. Such embodiments, however, are not limited to any particular application or any particular computing or data-processing environment. Instead, those skilled in the art will appreciate that the disclosed system and method may be advantageously applied to a variety of system and application software. Moreover, the present invention may be embodied on a variety of different computing platforms, including Macintosh, UNIX, LINUX, and the like.

Figure 3:
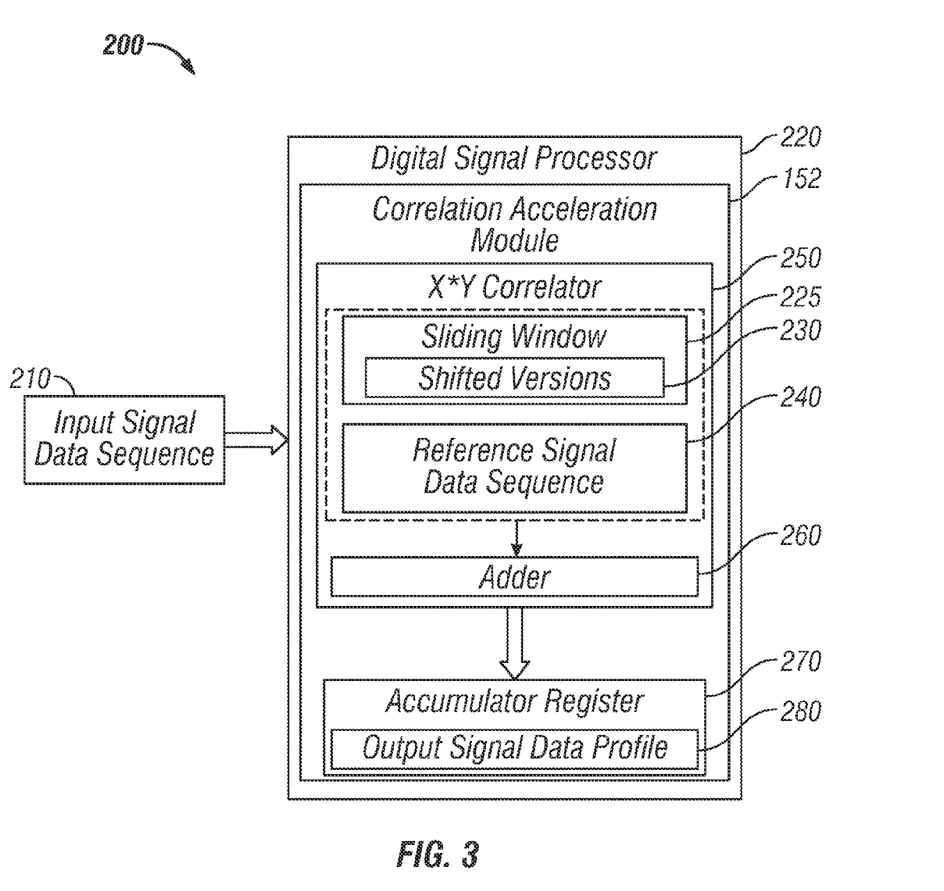
FIG. 3 illustrates a block diagram of a wireless communication system in association with a correlator, in accordance with the disclosed embodiments.

FIG. 3 illustrates a block diagram of a wireless communication system 200 in association with a correlator 250, in accordance with the disclosed embodiments. Note that in FIGS. 1-8, identical parts or elements are generally indicated by identical reference numerals. The wireless communication system 200 includes a digital signal processor 220 associated with the correlation acceleration module 152 for providing memory bandwidth efficient correlation acceleration in the wireless communication system 200. The digital signal processor 220 provides highly efficient mathematical operations to perform one or more signal processing functions in applications such as telecommunications, image processing, speech processing and generation, spectrum analysis, and audio processing and filtering applications.

Note that the digital signal processor 220 can be a specialized microprocessor and/or a co-processor with an optimized architecture with respect to the fast operational needs of the wireless communication system 200. The digital signal processor 220 can be employed to represent and process the digital signals in the communication system 200 as a sequence of numbers and/or symbols. The digital signal processor 220 typically measures, filters and/or compresses the sampled data of continuous analog signals in a wide range applications such as, for example, audio and speech signal processing, sonar and radar signal processing, sensor array processing, spectral estimation, statistical signal processing, digital image processing, and seismic data processing, etc.

The correlator 250 that includes a sliding window 225 and an adder 260 (e.g., a 40-bit accumulator) can be operatively configured in association with the digital signal processor 220 for correlating an input signal data sequence (X) 210 and its shifted versions 230 with a reference signal data sequence (r) 240. Note that the correlator 250 can be an X*Y correlator that can be employed to search a long duration signal for a shorter known feature. The correlator 250 typically receives the input signal data sequence 210, generates its shifted versions 230 in the sliding window 225, multiplies the input signal data sequence 210 and shifted versions 230 with reference signal data sequence 240, and produces a profile, one value for each original and shifted version (each time lag), in order to determine one or more appropriate shifted versions most resembling the reference sequence 240.

The correlator 250 further calculates the similarities between the input signal data sequence 210 or the shifted version 230 and the reference data sequence 240 by multiplying the input signal data sequence 210 and the shifted version 230 with the reference signal data sequence 240. The adder 260 further sums the results with respect to each column in the sliding window 225 in order to generate an output data profile 280. The output data profile 280 can be further stored into an accumulator register 270 in order to represent the partial similarities between the signals. Note that the accumulator register 270 can be, for example, a general-purpose accumulator register that is associated with the processor 220 of the wireless communication system 200. Note that the register 270 is generally a part of the processor 220. The correlator 250 may be, called on multiple times and once the correlation of the entire correlation length for all time lags is complete, the correlation profile 280 can be stored in the accumulator register 270. Note that the maximal sums in the accumulator register 270 represent the most likely candidates of the delayed input signal data sequences 210 to be a copy (or copies) of the reference data sequence 240.

Figure 4:
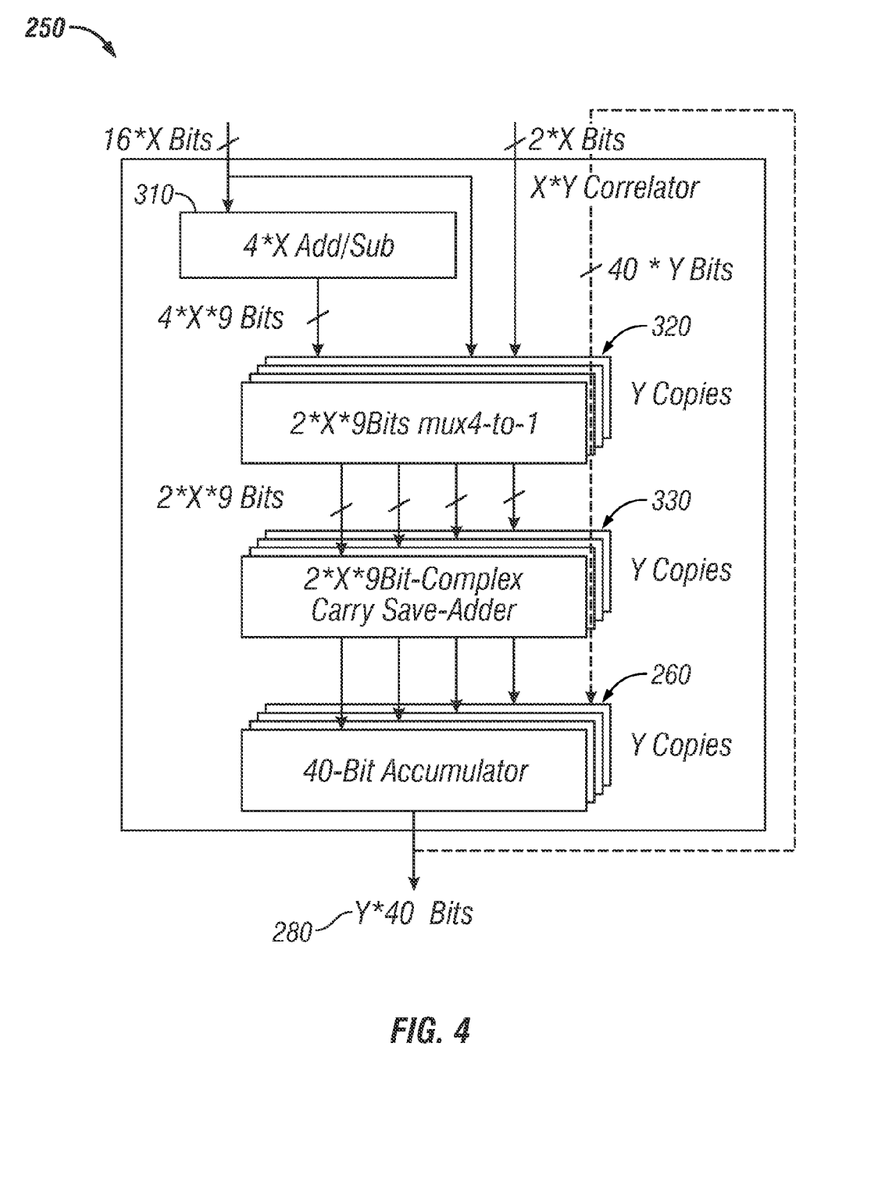
FIG. 4 illustrates a block diagram of the correlator, in accordance with the disclosed embodiments.

FIG. 4 illustrates a block diagram of the correlator 250, in accordance with the disclosed embodiments. The correlator 250 generally includes a plurality of adders (such as, 4*X add/sub) 310, an array of multiplexers 320, an array of bit-complex carry save adders 330, and an array of accumulators 260. Note that the array of accumulators 260 acts as the adders for summing the output data profile 280 of each column in the sliding window 225 of the correlator 250. The correlator 250 receives a 16*X bits of input signal data sequence 210 with respect to the communication system 200 and multiplies with a 2*X bits of reference signal data sequence 240 in order to generate a Y*40 bits of output signal data profile 280. The output signal data profile 280 is usually stored in the processor accumulator registers 270 and fed back to the correlator 250 by a loop in the application module 152 for further partial results accumulation. The adder 310 associated with the correlator 250 generates a 4*X*9 bits of output with respect to the multiplexer 320 utilizing the input signal data 210.

The multiplexer 320 further utilizes the 4*X*9 bits of output from the adder 310 and the 2*X bits reference signal data sequence 240 in order to generate a 2*X*9 bits of output with respect to the complex save adder 330. Note that the multiplexer 320 can be, for example, a 2*X*9 bits 4-input, 1-output multiplexer that performs multiplexing by selecting one input signal and forward the selected input into a single line. The complex carry save adder 330 can be, for example, a 2*X*9 bit complex carry save adder employed in a wide range of computer micro-architectures to compute the sum of three or more n-bit numbers in binary. The accumulator 260 can be a 40-bit accumulator that generates the Y" 40-bits of output signal data profile 280 in the correlator 250.

Figure 5:
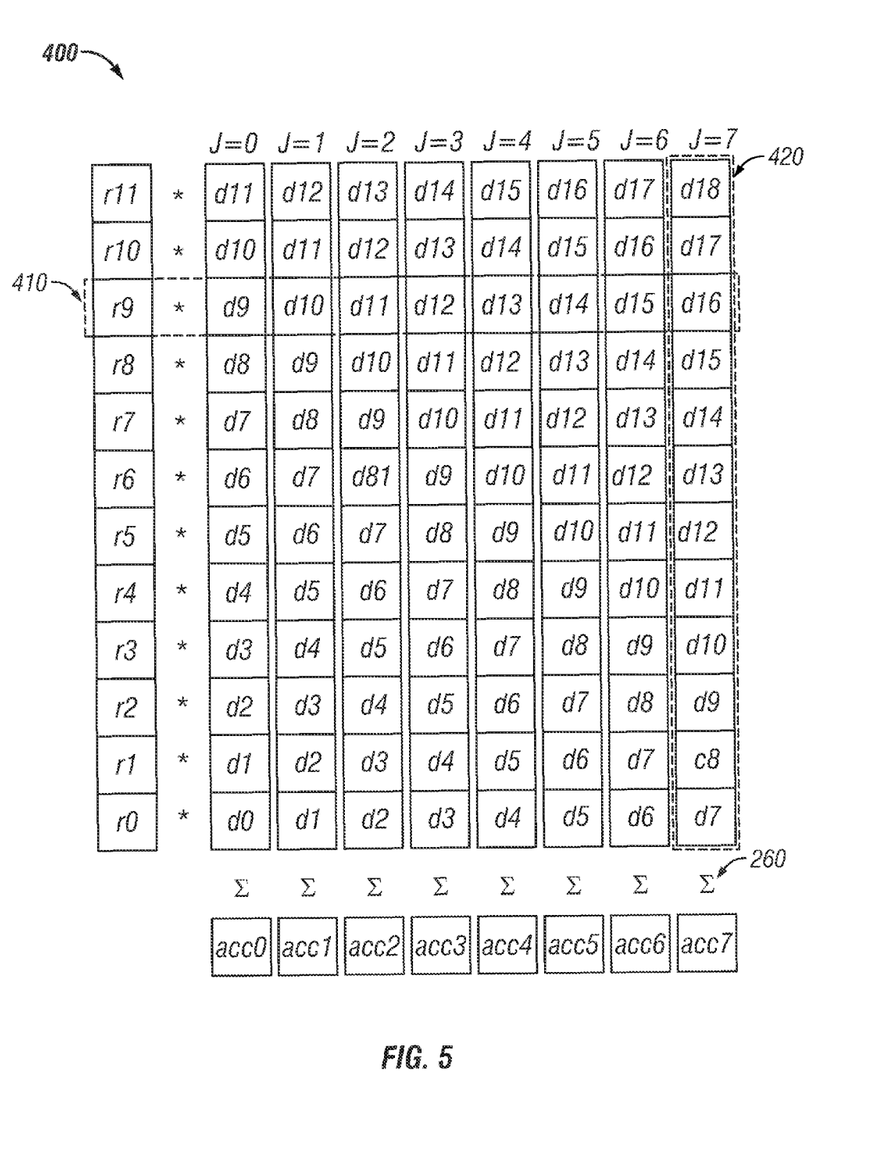
FIG. 5 illustrates a perspective view of a correlation computation array, in accordance with the disclosed embodiments.

FIG. 5 illustrates a perspective view of a correlation computation array 400, in accordance with the disclosed embodiments. The correlator 250 can be tightly integrated into a data path of the digital signal processor 220 in order to provide an intrinsic operation or processor instruction in the wireless communication system 200. The cross-correlation computation array 400 includes one or more columns, such as a column 420, that represents (a shifted version of) the input signal data sequence 210 with a time lag in the sliding window 225 of the correlator 250. The cross-correlation computation array 400 further includes one or more rows, such as a row 410, that represents a single data of the reference signal data sequence 240 and all of its possible corresponding input data values associated with various time lags in the sliding window 225. The cross-correlation with respect to the shifted input sequence can be mathematically represented as follows:

$$\forall \leq j < W, \operatorname{corr}(j) = \sum_{i=0}^{L-1} r'_i \times d_{i+j} \quad (1)$$

Similarly, the cross-correlation with respect to the shifted reference sequence can be mathematically represented as follows:

$$\forall\ \le j<W,\ \text{corr}(j)=\sum_{i=0}^{L-1}r'_{i-j}\times d_i \qquad (2)$$

wherein, 'W' represents the sliding window size and L represents the integration length or correlation length. 'L' also represents the size of the reference signal. Further, 'r' represents the complex conjugate of the reference signal data sequence 240, and 'd' represents the received input signal data 210. The input signal data sequence 210 typically includes soft values such as a 32-bit or 16-bit complex value. The reference data sequence 240 is typically a 2-bit complex (1 bit real and 1 bit imaginary) packed in a processor data word. Multiple reference data values can be therefore fetched in one memory access, achieving high memory bandwidth efficiency. Note that 'r' and 'd' are typically complex values for the wireless communication system 200. The multiplication of such values can be a complex multiplication.

The computation array 400 typically includes a length (such as L=12) and a width (such as W=8). Note that in real applications, the width and length of the computation array 400 can be arbitrary. A path searcher in a wideband code division multiple access (WCDMA) can include a width (such as W=320) and a length (such as L=2048). The X and Y values in the computation array 400 can be selected such that the maximum desired speedup is achieved in the correlator 250, yet not violating the processor's architecture limit. Note that the size of the input single data sequence 210 (X times single input data values) that is to be processed by the correlator 250 can be less than or equal to the memory bus width (bandwidth) associated with the processor 220. Similarly, the size of the accumulator 260 (Y times of a single output data size) can be less than or equal to the accumulator data path width associated with the processor 220. When X and Y are chosen under these constraints, the correlator 250 can be tightly integrated into a data path of the digital signal processor 220 in order to provide an intrinsic operation or processor instruction in the wireless communication system 200.

Note that the positions of the reference data sequence 240 and the input data sequence 210 can be swapped in accordance with the design considerations. In such a case, instead of generating shifted versions of input signal data sequence 210, the correlator 250 can generate the shifted versions 230 with respect to the reference signal sequence 240 for each column in the sliding window 225. For example, for X+Y−1 input data sequence 210 and X reference data sequence 240, the shifted versions 230 can be generated by positioning the reference data sequence 240 in the sliding window 225 and the input signal data sequence 210 on the left side of the array 400. Similarly, for X input data sequence 210 and X+Y−1 reference data sequence 240, the shifted versions can be generated by positioning the reference data sequence 240 in the left side and the input signal data sequence 210 in the sliding window 225 of the correlator 250, as illustrated in FIG. 5. As required, detailed embodiments of the present invention are disclosed herein; however, it is to be understood that the disclosed embodiments are merely exemplary of the invention that may be embodied in various and alternative forms. It can be appreciated that such embodiments reveal details of the structure of a preferred form necessary for a better understanding of the invention and may be subject to change by skilled persons within the scope of the invention without departing from the concept thereof.

Figure 6:
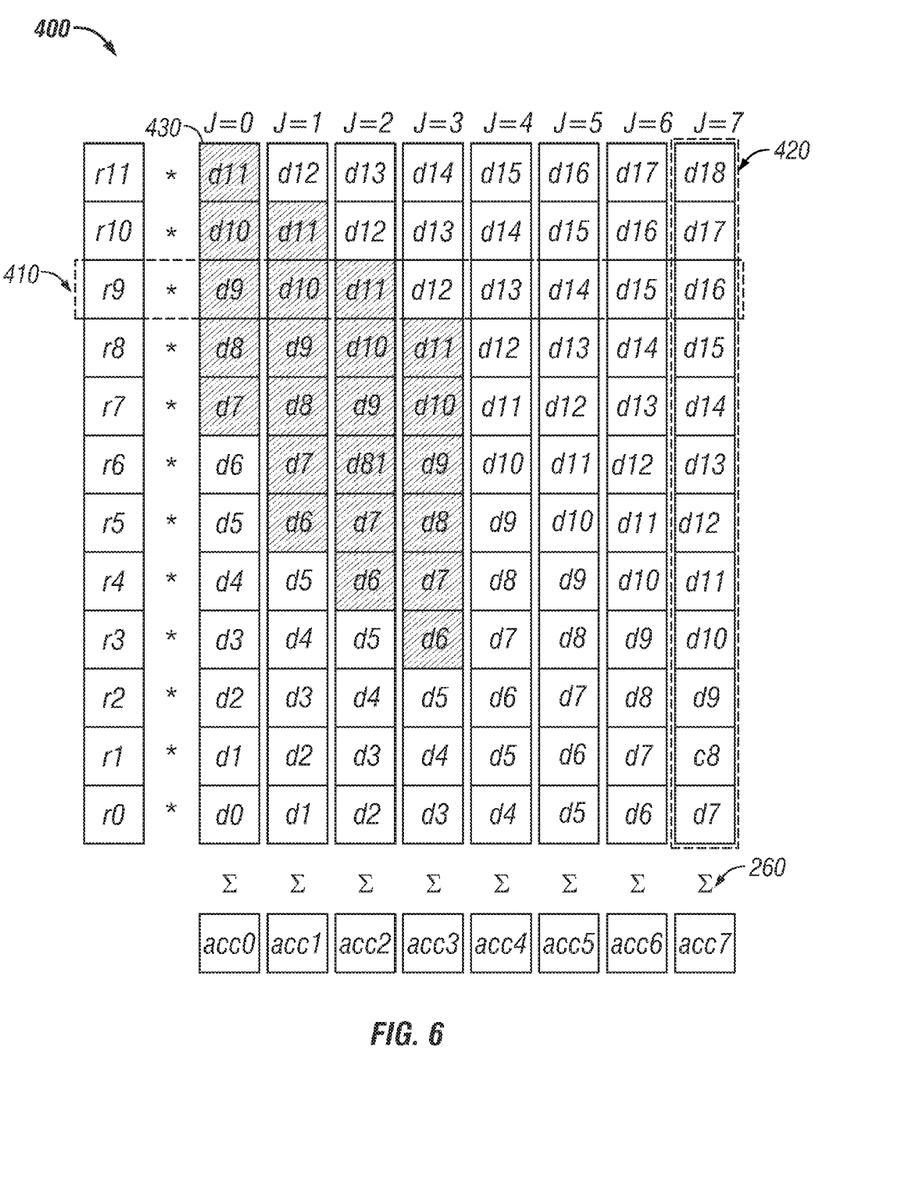
FIG. 6 illustrates a perspective view of the correlation computation array illustrating correlation acceleration, in accordance with the disclosed embodiments.

FIG. 6 illustrates a perspective view of the cross-correlation computation array 400 illustrating correlation acceleration, in accordance with the disclosed embodiments. The correlation computation array 400 associated with the sliding window 225 of the correlator 250 can be divided into one or more blocks (e.g., X*Y size blocks, where X≦L and Y≦W) such as a block 430 in order to compute a partial correlation profile with respect to each block in the sliding window 225. The output signal data 280 from the block 430 in the sliding window 225 can be iteratively summed to a previous partial computation result utilizing the adder 260. The input signal data sequence 210 and the reference signal data sequence 240 outside the computation array 400 are considered to be 'zero', if needed, in order to determine the boundary calculations with respect to the correlator 250. Note that the overhead involved at the boundaries can be negligible. The correlation computation (with respect to the input signal data sequence) that can be added as an instruction in the processor 220 can be represented as follows:

corr_acceleration(X_input,X_ref,prevX_ref,Y_accIn, Y_accOut) (3)

The correlation computation (with respect to the reference signal data sequence) can be represented as follows:

corr_acceleration(X_input,prevX_input,X_ref,Y_ac-cIn,Y_accOut) (4)

Note that the X*Y corr_acceleration instruction employs acceleration in two-dimensions and computes X*Y multiplications and accumulations (MAC) in a single operation, as opposed to X*Y operations (instructions) required by a traditional DSP. Thus the correlator 250 provides an enhanced speedup of O(X*Y) over a traditional digital signal processor.

The logic gate count complexity in the computation array 400 can be proportional to X*Y values. Note the reference signal data sequence 240 can be a complex antipodal (+1, −1) binary sequence. Therefore, the multiplications can be reduced to additions and subtractions that are determined by the sign of the reference signal data sequence 240. For complex signals, the results for each d(i)*C(i+j), j<w, regardless of the value of index j', can be enumerated as d(i)*(1+j), d(i)*(1−j), d(i)*(−1+j), and d(i)*(−1−j). Such values can be computed for each d(i) and then selected for each T in the computation array 400 to avoid redundant computations in the correlator 250. The computed results d(i)*r'(i+j) with respect to each column 420 in the computation array 400 are summed to a previous partial computation result utilizing the adder 260 in order to accelerate the correlation computation in the processor 220 of the wireless communication system 200.

Figure 7:
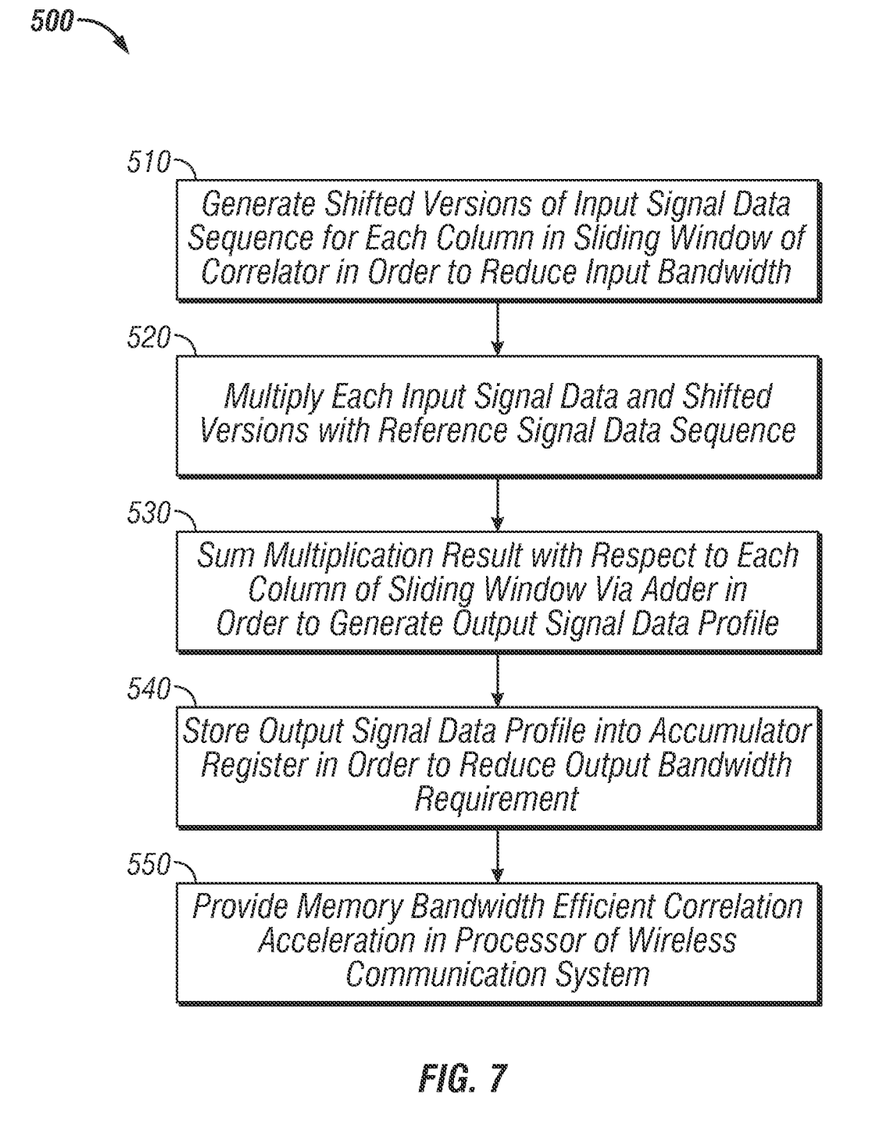
FIG. 7 illustrates a high level flow chart of operation illustrating logical operational steps of a method for providing memory bandwidth efficient correlation acceleration by shifting a sequence of input signal data, in accordance with the disclosed embodiments.

FIG. 7 illustrates a high level flow chart of operation illustrating logical operational steps of a method 500 for providing memory bandwidth efficient correlation acceleration by shifting the sequence of input signal data 210, in accordance with the disclosed embodiments. Again as a reminder, note that in FIGS. 1-8 identical parts or elements are generally indicated by identical reference numerals. The shifted version 230 with respect to the sequence of input signal data sequence 210 can be generated for each column in the sliding window 225 of the correlator 250 in order to reduce the input bandwidth requirement, as illustrated at block 510.

Each input signal data 210 along with the shifted version 230 can be further multiplied with the reference signal data 240 at each column of the sliding window 225, as depicted at block 520. The multiplication result at each column of the sliding window 225 can be thereafter summed together via the adder 260 in order to generate the output signal data profile 280, as indicated at block 530. The output signal data profile 280 can be stored into the accumulator register 270 of the processor 220 in order to reduce the output bandwidth requirement, as illustrated at block 540. Such an approach can be adapted to provide the memory bandwidth efficient correlation in the processor 220 of the wireless communication system 200, as indicated at block 550.

Figure 8:
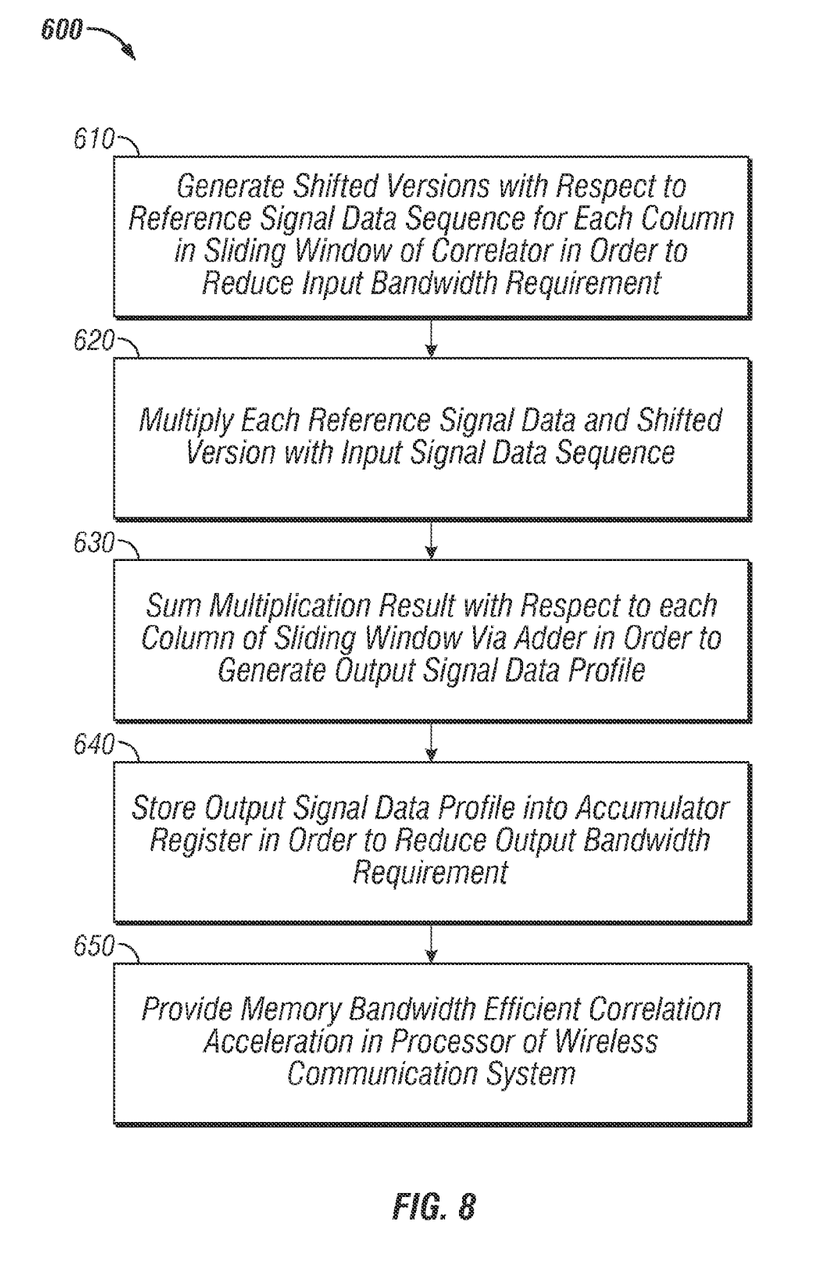
FIG. 8 illustrates a high level flow chart of operation illustrating logical operational steps of a method for providing memory bandwidth efficient correlation acceleration by shifting a sequence of reference signal data, in accordance with the disclosed embodiments.

FIG. 8 illustrates a high level flow chart of operation illustrating logical operational steps of a method 600 for providing memory bandwidth efficient correlation acceleration by shifting the sequence of reference signal data sequence 240, in accordance with the disclosed embodiments. The shifted version 230 with respect to the reference signal data sequence 240 can be generated for each column of the sliding window 225 inside the correlator 250 in order to reduce the input bandwidth requirement, as illustrated at block 610. Each reference signal data 240 and the shifted version 230 can be further multiplied with the input signal data 210 at each column of the sliding window 225, as depicted at block 620.

The multiplication result at each column of the sliding window 225 can be thereafter summed together via the adder 260 in order to generate the output signal data profile 280, as indicated at block 630. The output signal data profile 280 can be stored into the accumulator register 270 of the processor 220 in order to reduce the output bandwidth requirement, as illustrated at block 640. Such an approach can be adapted to provide the memory bandwidth efficient correlation in the processor 220 of the wireless communication system 200, as indicated at block 650. The system and method can be alternatively utilized in a wide variety of computation techniques that satisfies the input reuse and output reduction properties. Such system and method can be effectively utilized for accelerating correlation computation in the wide range of communication systems such as 3G, LTE, and WiMax, etc.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for providing a memory bandwidth efficient (cross) correlation acceleration, said method comprising:
   generating a plurality of shifted versions with respect to an input signal data sequence for each column of a sliding window associated with a correlator in order to reduce an input bandwidth requirement;
   multiplying concurrently said input signal data sequence and said plurality of shifted versions with a reference signal data sequence and summing a multiplication result with respect to each column of said sliding window in order to generate an output signal data profile; and
   storing said output signal data profile into an accumulator register of an array of accumulators that acts as adders for summing an output data signal profile of said each column in said sliding window of said correlator in order to reduce an output bandwidth requirement and thereby provide a memory bandwidth efficient correlation acceleration across a wide range of wireless communication systems.

2. The method of claim 1 further comprising:
   generating said plurality of shifted versions with respect to said signal data sequence for each column of said sliding window associated with said correlator in order to reduce said input bandwidth requirement; and
   multiplying concurrently said reference signal data sequence and said plurality of shifted versions with said input signal data sequence and summing a multiplication result with respect to each column of said sliding window in order to generate said output signal data profile.

3. The method of claim 1 further comprising summing said multiplication result at each column of said sliding window via at least one adder among said adders.

4. The method of claim 3 further comprising:
   dividing a computation array associated with said sliding window of said correlator into a plurality of blocks in order to compute a partial correlation with respect to said plurality of blocks in said sliding window; and
   iteratively summing an output signal data from said plurality of blocks in said sliding window with a previous partial computation result utilizing said at least one in order to thereafter accelerate correlation computation.

5. The method of claim 1 wherein said correlator comprises a two-dimensional X*Y correlator.

6. The method of claim 1 further comprising configuring said correlator to include at least one of the following components:
   at least one adder among said adders;
   at least one multiplexer;
   at least one complex carry save adder; and
   at least one accumulator, wherein said array of accumulators comprises said at least one accumulator including said accumulator register.

7. The method of claim 6 wherein said at least one adder comprises a 40-bit accumulator.

8. The method of claim 1 further comprising configuring said correlator in association with a processor capable of being adapted for use with a wireless communication system.

9. The method of claim 8 further comprising integrating said correlator into a data path of said processor for providing an intrinsic operation in said wireless communication system.

10. The method of claim 8 wherein said processor comprises a co-processor.

11. The method of claim 8 wherein said processor comprises a digital signal processor.

12. The method of claim 8 wherein said processor comprises a vector processor.

13. The method of claim 8 further comprising configuring said processor in association with said correlator in an FIR application with input reuse and output reduction.

14. A system for providing a memory bandwidth efficient (cross) correlation acceleration, said system comprising:
   at least one processor;
   at least one data bus coupled to said at least one processor; and
   a computer-usable medium embodying computer code, said computer-usable medium being coupled to said at least one data bus, said computer program code comprising instructions executable by said at least one processor and configured for:
      generating a plurality of shifted versions with respect to an input signal data sequence for each column of a sliding window associated with a correlator in order to reduce an input bandwidth requirement;
   an adder;
      integrating said correlator into a data path of said processor of said wireless communication system for providing an intrinsic operation in said wireless communication system.

15. The system of claim 14 wherein said instructions are further configured for:

generating said plurality of shifted versions with respect to said signal data sequence for each column of said sliding window associated with said correlator in order to reduce said input bandwidth requirement; and multiplying concurrently said reference signal data sequence and said plurality of shifted versions with said input signal data sequence and summing a multiplication result with respect to each column of said sliding window in order to generate said output signal data profile.

16. The system of claim 14 wherein said instructions are further modified for configuring said correlator in association with said at least one processor, wherein said at least one processor comprises a processor capable of being adapted for use with a wireless communication system.

17. The system of claim 16 wherein said instructions are further configured for:

summing said multiplication result at each column of said sliding window via output bandwidth requirement and thereby provide a memory bandwidth efficient correlation acceleration across a wide range of wireless communication systems.

18. The system of claim 16 wherein said instructions are further configured for:

dividing a computation array associated with said sliding window of said correlator into a plurality of blocks in order to compute a partial correlation with respect to said plurality of blocks in said sliding window; and iteratively summing an output signal data from said plurality of blocks in said sliding window with a previous partial computation result utilizing at least one adder among said adders in order to thereafter accelerate correlation computation.

19. A computer-usable for providing a memory bandwidth efficient (cross) correlation acceleration, said computer-usable medium embodying computer program code, said computer program code comprising computer executable instructions configured for:

generating a plurality of shifted versions with respect to an input signal data sequence for each column of a sliding window associated with a correlator in order to reduce an input bandwidth requirement;

multiplying concurrently said input signal data sequence and said plurality of shifted versions with a reference signal data sequence and summing a multiplication result with respect to each column of said sliding window in order to generate an output signal data profile; and storing said output signal data profile into an accumulator register of an array of accumulators that acts as adders for summing an output data signal profile of said each column in said sliding window of said correlator in order to reduce an multiplying concurrently said input signal data sequence and said plurality of shifted versions with a reference signal data sequence and summing a multiplication result with respect to each column of said sliding window in order to generate an output signal data profile; and storing said output signal data profile into an accumulator register of an array of accumulators that acts as adders for summing an output data signal profile of said each column in said sliding window of said correlator in order to reduce an output bandwidth requirement and thereby provide a memory bandwidth efficient correlation acceleration across a wide range of wireless communication systems.

20. The computer usable medium of claim 19 wherein said embodied computer program code further comprises computer executable instructions configured for:

generating said plurality of shifted versions with respect to said signal data sequence for each column of said sliding window associated with said correlator in order to reduce said input bandwidth requirement; and multiplying concurrently said reference signal data sequence and said plurality of shifted versions with said input signal data sequence and summing a multiplication result with respect to each column of said sliding window in order to generate said output signal data profile.

* * * * *